United States Patent [19]

Hergenrother et al.

[11] Patent Number: 5,872,176

[45] Date of Patent: Feb. 16, 1999

[54] ADDITION OF SALTS TO IMPROVE THE INTERACTION OF SILICA WITH RUBBER

[75] Inventors: William L. Hergenrother, Akron; James Oziomek, Cuyahoga Falls; William M. Cole, Clinton, all of Ohio

[73] Assignee: Bridgestone Corporation, Tokyo, Japan

[21] Appl. No.: 893,867

[22] Filed: Jul. 11, 1997

[51] Int. Cl.[6] .............................. C08K 3/36; C01B 33/18
[52] U.S. Cl. .......................... 524/494; 524/492; 524/493; 524/262; 423/331; 423/332; 423/333
[58] Field of Search .................................... 524/494, 432, 524/493, 262; 423/332, 333, 331

[56] References Cited

U.S. PATENT DOCUMENTS

| | | | |
|---|---|---|---|
| 3,928,541 | 12/1975 | Wason | 423/339 |
| 4,202,813 | 5/1980 | Wason | 423/339 |
| 4,371,655 | 2/1983 | Kroenke | 524/423 |
| 4,463,108 | 7/1984 | Wagner et al. | 423/339 |
| 5,089,554 | 2/1992 | Bomo et al. | 524/493 |
| 5,382,618 | 1/1995 | Castel | 524/423 |
| 5,412,018 | 5/1995 | Krivak et al. | 524/493 |
| 5,447,971 | 9/1995 | Bergh et al. | 524/262 |
| 5,569,697 | 10/1996 | Ferrandino et al. | 524/493 |
| 5,610,221 | 3/1997 | Waddell et al. | 524/494 |
| 5,723,529 | 3/1998 | Bernard et al. | 524/492 |

*Primary Examiner*—James J. Seidleck
*Assistant Examiner*—Olga Asinovsky
*Attorney, Agent, or Firm*—Frank J. Troy, Sr.

[57] ABSTRACT

Incorporation of neutral water soluble inorganic salts into a precipitated silica improves the filler dispersion in a compounded rubber, reduces rolling resistance (hysteresis), and improves processability. These properties are achieved without loss of the expected reinforcement effect due to the substitution of inorganic salt for $SiO_2$ in the silica. The properties are seen when a variety of silanes and processing aids are added to the silica.

13 Claims, No Drawings

ADDITION OF SALTS TO IMPROVE THE INTERACTION OF SILICA WITH RUBBER

FIELD OF INVENTION

The physical properties of a precipitated silica filled vulcanizate can be modified by using a precipitated silica with above 1 wt. % residual inorganic salt such as sodium sulfate. The vulcanizate rubber can be natural rubber, EPDM rubber or a synthetic rubber having at least 30 wt. % repeat units from a conjugated diene having 4 to 8 carbon atoms. The tan delta value at 50° C. can be reduced to form a pneumatic tire composition which would have reduced rolling resistance.

BACKGROUND OF THE INVENTION

The physical properties of rubber vulcanizates have traditionally been modified with particulate fillers to change their stiffness and hardness for specific applications such as tires. Conventional fillers include carbon blacks, precipitated silicas, clays, and talc. Carbon black has been highly preferred for tire applications as it contributes not only to the stiffness of the cured vulcanizate but also imparts added strength and toughness. The availability of a multitude of carbon blacks with different surface areas, particle sizes and structure has allowed researchers to quantify the variables that determine rubber reinforcement. Particulate fillers with high surface areas per gram of material, good surface interaction with rubber, and high structure contribute more to rubber reinforcement than particulate fillers with lower amounts of these three variables. Carbon black tends to have better surface interaction with rubber than does silica making it a preferred filler. The manufacturing technologies for carbon black and silica allow easy control over the surface area per gram and the structure of both types of fillers.

Silicas include precipitated silica, fumed silica, natural deposits high in $SiO_2$ and manufacturing byproducts high is $SiO_2$. Fumed silica is highest in price and more often is used in silicone rubbers than diene based elastomers. This is predominantly due to its higher cost per pound. Precipitated silicas are used in significant quantities in diene based elastomers.

Precipitated silicas are prepared by neutralizing a soluble silicate such as sodium silicate under controlled conditions such as temperature, silicate concentration, pH, electrolyte concentration, and controlled particle nucleation during particle growth cycles. Neutralizing agents for sodium silicate include hydrochloric acid, sulfuric acid, phosphoric acid, and carbonic acid. After a precipitated silica of the desired characteristics is formed the silica is generally separated from the excess water by filtration and washed to remove most of the nonsilica byproducts, e.g. $Na_2SO_4$, $NaCl$, $NaHCO_3$, $Na_2HPO_4$ and $NaH_2PO_4$ or $Na_2CO_3$. Inorganic salts are not conventionally added to rubber compositions and silica manufacturers expend effort to reduce the inorganic salt content to less than 0.5 wt. %. Besides certifying particle size surface area, and pH most silica manufacturers certify less than 0.5 wt. % inorganic salt. The silica is generally dried to less than 10 wt. % total water and the particle size adjusted by milling and/or air classification as desired. For increased reinforcing effects silica can be treated with silane coupling agents to increase the interaction of the silica surface with the rubber thereby modifying the physical properties of the vulcanized rubber. The silane coupling agents which are most useful typically have or generate silanol groups which can react and bond to the silanol groups on the silica surface. The silane coupling agent can have mercaptan groups, polysulfide groups, or vinyl groups which can react with and crosslink to the diene based elastomers.

SUMMARY OF THE INVENTION

Conventional precipitated silicas are washed during manufacture to free them of adherent inorganic salt byproducts from the precipitation. The removal of the 20 to 30 wt. % of inorganic salt based on the dry silica component weight reduces the weight of the yield from the process and the inorganic salt removed must be discarded or recycled. The inorganic salt unexpectedly has been found to modify a compounded rubber's properties by improving filler dispersion, improving processability and desirably decreasing the tan delta at 50° C., reduce the 50% strain modulus, and increasing the 300% strain modulus of cured vulcanizates when it is not removed or only partially removed from precipitated silicas. When these silicas with higher salt content are used in vulcanizates they can optionally include from about 0.1 or 0.5 to about 18 or 20 parts by weight per 100 parts of silica of a silane or a shielding agent or combinations thereof applied to the silica. The most common adherent inorganic salts on silicas are the sodium or potassium salts of chloride, sulfates, phosphates or carbonates. Combinations of the salts may also be present. Desirably the vulcanizates are cured with sulfur and/or sulfur based accelerators. A preferred use of the vulcanizates is as a component in a pneumatic tire.

DETAILED DESCRIPTION OF THE INVENTION

It has been found that adherent inorganic salts (often a byproduct of silica precipitation) need not be predominantly removed from precipitated silica before the silica is used in some rubber vulcanizates. The presence of the inorganic salt can modify a compounded rubber's properties by improving filler dispersion, improving processability and desirably decreasing the tan delta value at 50° C. of a vulcanizate, decreasing the modulus at 50% strain, and increasing the modulus at 300% strain. The salts are desirably added from an aqueous solution if they are not byproducts of the silica precipitation.

Any conventional precipitated silica can be used in the process or product. Usually sodium or potassium silicate is one starting material and the other is a strong acid such as sulfuric acid, hydrochloric acid, phosphoric acid, or carbon dioxide or combinations thereof. Processes for producing precipitated silicas are described in U.S. Pat. Nos. 2,657,149; 2,940,830; and 4,681,750 which are herein incorporated by reference. The amount of the precipitated silica component is desirably from about 4 to about 90 phr, more desirably from about 8 to about 70 phr and preferably from about 10 to about 50 phr. The physical properties of the vulcanizates will depend on the amounts and type of rubber (s) used, the amount and characteristics of silica used, the amount and type of curatives, and the amount and type of other additives.

The preferred silicas for rubber vulcanizates will have BET surface areas of from about 60 to about 550 $m^2$/g more desirably from about 100 to about 450 $m^2$/g and preferably from about 100 to about 300 $m^2$/g. BET refers to a Brunauer, Emmett, and Teller method according to ASTM 819-77 using nitrogen as the adsorbate but modified by outgassing the system and the sample for 1 hour at 180° C. Desirably the silica will have a pH from about 5 to about 11.5 and more desirably from about 6 to about 10.5 most desirably from about 6 to about 7. Desirably the percent $SiO_2$ will be above 50 wt. % and more desirably from about 60, 70 or 75 wt. % to about 80, 90, 95 or 98 wt. % of the silica component. The percent water as determined by drying 2 hours at 105° C. will desirably be up to about 20 wt. % and more desirably from about 2 to about 10 or 15 wt. %. Additional more tightly bound water may be lost on drying at 1000° C. for 2 hours. The silica desirably can absorb from about 1 to about 5 times its weight in dibutyl phthalate, more desirably from about 1.5 to about 4 times its weight. The dibutyl phthalate absorption values indicate higher structure with higher absorption. If it is a milled product the silica will desirably have a weight average agglomerate size (diameter) of from about 1 or 2 $\mu$m to several hundred $\mu$m. If it is a spray dried product the particles may be larger, but will break down to the smaller sizes when mixed with the rubber. The aggregate size can be controlled by milling, micronizing and/or classification (e.g. air classification).

The adherent inorganic salt can be present from about 1 or 2 to about 25, 30 or 35 percent by weight of the silica component. More desirably it is from about 3 to about 30 percent by weight and preferably from about 5 to about 30 percent by weight of the silica component. The silica component is defined as the $SiO_2$, any in-organic salt present, and any other materials typically present in silica such as moisture trace metals etc. The salt can include Na, K, Li, Ca and/or Mg cations and anions from sulfuric acid, hydrochloric, phosphoric acid, and/or carbonic acid (from $CO_2$ and $H_2O$). Preferably the cations are predominantly Na and K. Some Ca and Mg are typically present if only as impurities from the water and silicate. It is anticipated that the salt needs to be at least partially adhered to the silica to be effective. If the inorganic salt is a byproduct of the silica manufacturing process it will be present in the filter cake (material to large to pass through filter paper or filter cloth and its occluded water). As the silica from the filter cake and its occluded water is dried the inorganic salt will exceed its water solubility and deposit on the silica and/or on salt crystals nucleated in the water. Thus the adherent inorganic salt will include some salt deposited on the silica and some free salt. The relative ratios of deposited salt and free salt will depend on the characteristics of the silica (e.g. surface area etc.) and the drying conditions (e.g. slow oven drying or quick spray drying). Desirably a majority of the inorganic salt (e.g. at least 50, 60, or 70 wt. % is coated onto or bound to the silica surfaces (either as continuous or discontinuous coatings) to modify the silica surface.

Optionally additional specific inorganic salts can be added to the precipitated silica before or after precipitation to modify the silica surface. These inorganic salts would desirably be selected from the cations and anions listed and would enhance certain properties.

Desirably the silica surface is further modified with a silane and/or a shielding agent. Desirably the amount of the silane or the shielding agent or combinations thereof if both are specifically added to modify the silica surface is from about 0.1 or 0.5 to about 18 or 20 parts and preferably from about 0.5 to about 12 parts by weight based on 100 parts by weight of the silica component. Silanes refers to molecules having at least one silicon atom and at least one group that can react and bind to a silica surface or a group that can form another group that can react and bind to a silica surface (e.g. an alkoxy group that can leave as an alcohol forming a silanol group). Examples of silanes include alkyltriethoxy or trimethoxy silane, dialkyl diethoxy or dimethoxy silane and trialkyl ethoxy or methoxy silane where each alkyl and each alkoxy group can have from 1 to 16 carbon atoms, more preferably from 1 to 10 carbon atoms. A preferred silane is octyl triethoxy silane or trimethylmethoxy silane. Another silane is hexamethyl disilazane. A subset of silanes is silane coupling agents which can both bond to unsaturation in vulcanizable rubbers and bond to silica surfaces thus coupling the rubber to the silica with chemical bonds. The rubber reactive group of a silane coupler can include mercapto, polysulfide, amino, vinyl and epoxy groups. Preferred are mercapto and polysulfide groups.

Silane coupling agents useful in the composition of this invention are known. Examples of useful silane coupling agents include N-β-(aminoethyl)-γ-aminopropyltrimethoxysilane, γ-aminopropyltriethoxy silane, bis (β-hydroxyethyl)-γ-aminopropyltriethoxy silane, β-(3,4-epoxycyclohexyl)ethyltrimethoxy silane, γ-glycidoxypropyltrimethoxy silane, γ-methacryloxypropyltrimethoxy silane, vinyl trichlorosilane, vinyl triethoxysilane, and vinyl tris(β-methoxyethyl) silane. A preferred silane coupling agent is bis(3-triethoxysilylpropyl)-tetrasulfide, also know and sold as Si69® (DeGussa AG). As the addition of Si69® contributes additional sulfur to the rubber formulation, applicants reduce the amount of free sulfur in the rubber formulation when adding Si69®. The silanes can be prereacted with the silica or added during the rubber mixing. In the examples the silanes were added during rubber mixing. Due to the reactivity of Si69® with rubber the mix temperature was kept below about 145° C. when Si69® was present.

The shielding agents are desirably absorbed on the silica surface thereby desirably modifying it to interact with the rubber to decrease tan delta at 50° C., or reduce the modulus at 50% strain, or increase the modulus at 300% strain. If the silica surface is not modified it has numerous silanol groups which make the surface very polar. The shielding agents cover some of the silanol groups making the silica surface less polar. The rubbers specified in this disclosure being primarily hydrocarbons are generally nonpolar and interact better with a nonpolar or shielded silica surface. Shielding agents include a variety of low molecular weight (e.g. number average molecular weight from about 50 to about 3000) oils and functional compounds. The shielding agent can be added to modify the silica or it can be a component already in the rubber formulation for another purpose. A preferred shielding agent is sorbitan monooleate. The amount of silanes and shielding agents used will depend on the silica surface area and the sought after degree of change in the vulcanizate properties.

The rubber can be a single rubber or a blend of two or more rubbers. Preferred rubbers are natural rubber, EPDM rubber, and synthetic rubbers with at least 30, 50, or 65 wt. % repeat units from at least one conjugated diene monomer or combinations of said rubbers. Butyl rubber, halobutyl rubber or halogenated copolymers of isobutylene and p-methylstyrene can be one or more of the rubbers used. EPDM rubber is generally a copolymer of at least ethylene, propylene, and a nonconjugated diene having from 6 to 18 carbon atoms. The weight ratio of ethylene to propylene in the EPDM may vary from about 5.7 to about 0.4. The nonconjugated diene can be from about 1 to about 20 wt. % of the EPDM with repeat units from ethylene and propylene being the remainder. Examples of synthetic rubbers include synthetic polyisoprene rubber, butadiene rubber, styrene-butadiene rubber, butadiene-acrylonitrile rubber and polymers having three or more different repeat units such as styrene/isoprene/butadiene rubber. Desirably the rubber of this disclosure excludes silicone rubbers which are predominantly diorganosilane repeat units. Also desirably excluded are synthetic rubbers having at least 50 wt. % repeat units from acrylate monomers. As is the custom in rubber compositions the amount of many of the later recited additives will be measured in parts by weight per 100 parts of the total rubber (phr) wherein the 100 parts by weight rubber will comprise the above rubbers.

A curative system is included to crosslink (vulcanize) the rubber. The curative system can include sulfur, desirably used in amounts from about 1 to about 3 phr, and sulfur donor compounds and/or accelerators. Accelerators include thioureas, guanidine, xanthates, dithiocarbamates, thiuramsulfides, heterocyclics like mercaptobenzothiazole, and sulfenamides. Preferred accelerators are alkylbenzothiazole and diarylguanidine. Preferred amounts of accelerators are from about 0.1 to about 5 phr. Other curatives based on peroxides or non sulfur compounds could also be used alone or in combination with the sulfur type curatives.

The rubber composition may include various other additives including fillers, with carbon black being preferred filler; metal oxides such as zinc oxide; processing aids; extender oils; plasticizers; anti-degredants and the like. Carbon black is desirably present in amounts from about 2 to about 80 phr and more desirably from about 4 to about 45 phr.

The invention has particular utility as a composition for one or more components in a tire (where reduced rolling resistance is important for mileage) and in shoe soles, joints and seals. The changes in physical properties are important for non-tire applications as the lower modulus at 50% strain makes a more compliant rubber article and the higher modulus at 300% strain makes a tougher article (e.g. compliant at low strains but more rigid at higher strains). The improvements in filler dispersion and processability will enhance product quality and production rates. The reduction in tan delta at 50° C. is important for non-tire applications as rubber articles with low tan delta values heat up less due to intra and intermolecular motion.

The following desirable changes in vulcanizate properties have been observed. The adherent inorganic salt reduced the processing viscosity of the vulcanized rubber composition as measured by the ML 1+4/100° C. This is desirable as it reduces the mixing energy requirements of the composition, reduces heat buildup during mixing, and allows for better flow during preparation of a crosslinked article (e.g. extruding, molding etc. of the uncrosslinked vulcanizate). The tan delta at 7% elongation at 24 and 50° C. was reduced indicating a strong probability of reduction in the rolling resistance. The reduction in delta G' (the difference in G' at 0.25% elongation and 14.5% elongation) indicates good filler dispersion and a strong probability of reduced rolling resistance in a pneumatic tire tread. A reduction in the low strain modulus, as exemplified at 50% strain, sometimes occurred along as did an increase in the high strain modulus, as exemplified at 300% strain. These changes are desirable as the molded article is more easily deformed at low strain to comply to small strains but the article becomes more rigid and resistant to change when larger strains that would eventually result in failure are applied.

The following examples set forth specific embodiments and illustrate the type of property changes which occur in the vulcanizates.

The silicas used in the examples were obtained from PPG Industries Pittsburgh Pa. HiSil# 190 and Flogard# SP both have a nominal physical properties of surface area equal to 215 $m^2/g$, dibutyl phthalate oil absorption of 260 ml/100 g of silica, loss on drying 1 hour at 100° C. of 6%, pH of 7, and $Na_2SO_4$ content of 0.4 percent by weight. The HiSil# comes in pellet form while the Flogard# SP is a free flowing powder. Silicas with similar rubber reinforcing properties to HiSil# and Flogard# SP are available from other silicas manufacturers such as DeGussa, Rhone Poulenc, and Huber. Many of the silicas with higher salt contents were prepared by PPG Industries according to their procedure for HiSil# or Flogard# SP but the $Na_2SO_4$ from the precipitation reaction was only partially removed before drying. Other silicas with higher (non $Na_2SO_4$) salt contents were prepared by adding aqueous salt solutions to a Flogard# SP silica and then redrying the silica.

Table I is a recipe used to prepare the rubber compositions and rubber vulcanizates evaluated in later tables. In Tables II–VI the silica characterization is first given, then the ML 1+4/130 or 100° C. is a physical property of the green (uncured) composition, and the rest of the properties are those of the vulcanized (cured) rubber compositions.

EXAMPLES

TABLE I

| RUBBER MASTERBATCH | |
|---|---|
| Material | phr |
| Styrene-butadiene rubber* | 75 |
| Natural rubber | 25 |
| Silica | 30 |
| Silane or shielding agent | varies |
| Carbon black | 35 |
| Oil | 15 |
| Stearic acid | 1.5 |
| Antioxidant and wax | 1.95 |
| Zinc oxide | 2.5 |
| Accelerators | 2.25 |
| Sulfur | 2.45 |
| Total | varies |

When 3 phr of Si69 was used in Tables II and III then 0.75 phr less sulfur was added to obtain the same cure.
*Styrene-butadiene rubber was 20 wt. % styrene and 80 wt. % butadiene of which 60 wt. % is vinyl with a ML 1 + 4 @ 100° C. for the polymer of about 70 to 80.

TABLE II

RUBBER FORMULATIONS WITH 3 PHR Si69 ® AND SILICAS WITH DIFFERENT SALT CONTENTS

| | Control 1 HiSil ™ 190 | Ex. A | Ex. B | Ex. C | Ex. D | Ex. E | Control 2 Flogard SP ™ | Ex. F | Ex. G | Ex. H | Ex. I | Ex. J |
|---|---|---|---|---|---|---|---|---|---|---|---|---|
| *Silica Characterization* | | | | | | | | | | | | |
| Na2SO4 (wt. %) | <0.5 | 23 | 1.75 | 12 | 8 | 1.41 | <0.5 | 15 | <0.5 | <0.5 | <0.5 | <0.5 |
| Surface Area, m$^2$/g | 200 | 148 | 208 | 170 | 189 | 215 | 200 | 165 | ~200 | ~200 | ~200 | ~200 |
| pH | 6.9 | 5.7 | 6.1 | 6.2 | 6.4 | 6.2 | 6.9 | 6.4 | ~6.4 | ~6.4 | ~7 | ~6.4 |
| Added Salt (wt. % of silica component) | | | | | | | | | KCl (8) | MgSO4 (8) | Na—PO4* (8) | LiCl; (8) |
| *Physical Test Results* | | | | | | | | | | | | |
| ML1 + 4/130C | 49.5 | 38 | 44.6 | 41.8 | 45.4 | 48 | 50.3 | 43.3 | 49.7 | 48.8 | 51.3 | 43.7 |
| *Ring Tensile @ 24C* | | | | | | | | | | | | |
| 50% Modulus, MPa | 1.50 | 1.39 | 1.50 | 1.65 | 1.44 | 1.37 | 1.39 | 1.38 | 1.52 | 1.72 | 1.52 | 1.70 |
| 300% Modulus, MPa | 12.72 | 12.79 | 13.49 | 15.43 | 14.00 | 12.52 | 13.39 | 13.69 | 13.43 | 14.96 | 14.18 | 13.46 |
| Tensile str., MPa | 14.92 | 15.35 | 16.29 | 18.49 | 16.56 | 15.86 | 18.69 | 18.31 | 17.01 | 18.30 | 14.76 | 16.18 |
| % Elongation | 340 | 346 | 348 | 345 | 341 | 359 | 386 | 375 | 362 | 351 | 316 | 348 |
| *Ring Tensile @ 100C* | | | | | | | | | | | | |
| 50% Modulus, MPa | 1.21 | 1.15 | 1.16 | 1.14 | 1.19 | 1.17 | 1.19 | 1.12 | 1.35 | 1.30 | 1.37 | 1.50 |
| 200% Modulus, MPa | 5.84 | 6.12 | 5.88 | 6.05 | 6.20 | 5.79 | 5.80 | 5.97 | 6.55 | 6.17 | 6.94 | 6.42 |
| Tensile str., MPa | 9.43 | 7.50 | 9.72 | 8.88 | 9.17 | 9.52 | 9.95 | 9.14 | 9.57 | 8.88 | 7.60 | 8.43 |
| % Elongation | 283 | 231 | 283 | 260 | 261 | 283 | 293 | 268 | 264 | 262 | 215 | 248 |
| Ring Tear @ 171C, MPa | 0.94 | 0.72 | 0.73 | 0.66 | 0.65 | 0.77 | 1.01 | 0.98 | 0.92 | 0.84 | 0.79 | 1.10 |
| Lambourn @ 65% slip, g lost | 0.1404 | 0.1524 | 0.1354 | 0.1422 | 0.1362 | 0.1314 | 0.1320 | 0.1439 | 0.1451 | 0.1472 | 0.1539 | 0.1566 |
| Lambourn @ 65% slip, INDEX | 0.99 | 0.91 | 1.03 | 0.98 | 1.02 | 1.06 | 1.01 | 0.93 | 0.92 | 0.91 | 0.87 | 0.85 |
| Wet Stanley London (#/-std) | 63/53.5 | 59/53.5 | 61/53.5 | 58/53.5 | 61/53.5 | 60/53.5 | 57/53 | 57/53 | 57/53 | 57/53 | 59/53 | 60/53 |
| Shore A, @ 23 ± 2° C. | | | | | | | 69.9 | 68 | 70.6 | 68 | 70 | 71.2 |
| *Rheometrics* | | | | | | | | | | | | |
| Tan delta @ 7% elong. 24° C. | 0.1756 | 0.1234 | 0.1562 | 0.1343 | 0.1483 | 0.1537 | 0.1566 | 0.1321 | 0.1444 | 0.1452 | 0.1462 | 0.1937 |
| Delta G' X e-7 @ 24° C. | 3.545 | 1.233 | 2.231 | 1.548 | 2.OSS | 2.161 | 2.189 | 1.376 | 2.399 | 2.084 | 2.418 | 4 77 |
| G' X e-7 @ 14.5% elong. 24° C. | 2.661 | 2.113 | 2.321 | 2.223 | 2.193 | 2.257 | 2.328 | 2.137 | 2.609 | 2.426 | 2.619 | 3.099 |
| Tan delta @ 7% elong. 50° C. | 0.1289 | 0.0846 | 0.1146 | 0.0929 | 0.1022 | 0.1249 | 0.1202 | 0.0942 | 0.1086 | 0.0971 | 0.0936 | 0.1547 |
| Delta G' X e-7 @ 50° C. | 2 | 0.756 | 1.524 | 0.92 | 1.289 | 1.571 | 1.59 | 0.93 | 1.73 | 1.404 | 1.545 | 2.718 |
| G' X e-7 @ 14.5% elong. 50° C. | 2.201 | 1.831 | 2.144 | 1.87 | 2.067 | 1.987 | 2.121 | 1.879 | 2.223 | 2.237 | 2.405 | 2.501 |

*The NaPO4 was an approximate 50:50 mixture of mono and disodium phosphate such that the pH was about 7.
To standardize the total sulfur in the above rubber compositions, the amount of sulfur in the masterbatch was reduced by 0.75 phr due to the sulfur in the Si69 ®.
All G' values are dynes/cm$^2$. Delta G' is the difference between the value at 0.25% elongation and 14.5% elongation.

TABLE III

RUBBER FORMULATIONS WITH 3 PHR OF Si69 ®
AND SILICAS WITH DIFFERENT SALT CONTENTS

|  | Control 6 HiSil ™ 190 | Ex. Q | Ex. R |
|---|---|---|---|
| Silica Characterization | | | |
| Silica Na2SO4 (wt. %) | <0.5 | 7.7 | 8.5 |
| Surface Area, m$^2$/g | 200 | 191 | 190 |
| pH | 6.9 | 6.1 | 6.3 |
| Physical Test Results | | | |
| ML1 + 4/100C | 60.6 | 55.4 | 55.5 |
| Ring Tensile @ 24C | | | |
| 50% Modulus, MPa | 1.77 | 1.70 | 1.55 |
| 300% Modulus, MPa | 14.78 | 14.85 | 13.19 |
| Tensile str., MPa | 19.45 | 18.90 | 17.81 |
| % Elongation | 371 | 361 | 377 |
| Ring Tensile @ 100C | | | |
| 50% Modulus, MPa | 1.37 | 1.47 | 1.50 |
| Tensile str., MPa | 9.15 | 9.37 | 10.09 |
| % Elongation | 268 | 258 | 271 |
| Ring Tear @ 171C, MPa | 0.72 | 0.67 | 0.84 |
| Lambourn @ 65% slip, g lost | 0.1448 | 0.1579 | 0.1512 |
| Lambourn @ 65% slip, INDEX | 1.05 | 0.96 | 1.01 |
| Wet Stanley London (#/std) | 57/52 | 57/52 | 58/51.5 |
| Shore A, @ 23 ± 2° C. | 70.1 | 68.3 | 67.9 |
| Rheometrics | | | |
| Tan delta @ 7% elong. 24° C. | 0.1738 | 0.1585 | 0.1545 |
| Delta G' X e-7 @ 24° C. | 4.277 | 3.151 | 2.774 |
| G' X e-7 @ 14.5% elong. 24° C. | 2.725 | 2.638 | 2.574 |
| Tan delta @ 7% elong. 50° C. | 0.1346 | 0.1169 | 0.1127 |
| Delta G' X e-7 @ 50° C. | 3.149 | 2.066 | 1.851 |
| G'X e-7 @ 14.5% elong. 50° C. | 2.495 | 2.281 | 2.19 |
| Molecular Weight Between Crosslinks | | | |
| Mc, g/mol | 10040 | — | 9955 |

*To standardize the total sulfur in the above rubber compositions, the amount of sulfur in the masterbatch was reduced by 0.75 phr due to the sulfur in the Si69 ®.

Table II illustrates that significant amounts of inorganic salt (either Na$_2$SO$_4$ byproduct of precipitation or salt solutions) can be present in the silica component in a rubber formulation without degrading the physical properties and often improving selected physical properties. This is unexpected as inorganic salts are not considered as reinforcing fillers while silica is considered a reinforcing filler. The examples of Table II used a Si69® silane coupling agent in combination with the silica. The low delta G' values are indicative of a good dispersion of the silica. Whenever additives (salt in this case) are screened for inclusion in a rubber formulation there is a need to assure that the additive does not negatively affect the dispersion of carbon black and silica (if present). Other factors to be considered when comparing physical properties of filled rubber compositions are the properties of the filler (surface area, pH, and particle size) and the extent of cure (often measured by molecular weight between crosslinks).

The data in Table III is similar to the data in Table II. Both tables use a Si69® coupling agent. In Table III the surface area of the higher salt content silicas varies less from the control. Table III shows a desirable decrease in the ML1+4/100° C., a desirable lower 50% modulus at 24° C., a desirable low delta G' and a molecular weight between crosslinks for the rubber component that is almost identical for the control and example R.

TABLE IV

RUBBER FORMULATIONS WITH 1.5 PHR OCTYL TRIETHOXY
SILANE AND SILICAS WITH DIFFERENT SALT CONTENTS

|  | Control 3 HiSil ™ 190 | Ex. K | Ex. L |
|---|---|---|---|
| Silica Characterization | | | |
| Na2SO4 (wt. %) | <0.5 | 7.7 | 8.5 |
| Surface Area, m$^2$/g | 200 | 191 | 190 |
| pH | 6.9 | 6.1 | 6.3 |
| Physical Test Results | | | |
| ML1 + 4/100C | 73.6 | 62.2 | 63.8 |
| Ring Tensile @ 24C | | | |
| 50% Modulus, MPa | 1.30 | 1.37 | 1.44 |
| 300% Modulus, MPa | 8.68 | 9.96 | 10.56 |
| Tensile str., MPa | 10.94 | 13.85 | 15.11 |
| % Elongation | 355 | 377 | 385 |
| Ring Tensile @ 100C | | | |
| 50% Modulus, MPa | 1.07 | 1.20 | 1.29 |
| 200% Modulus, Mpa | 4.01 | 4.62 | 4.92 |
| Tensile str., MPa | 6.41 | 7.53 | 8.20 |
| % Elongation | 282 | 286 | 291 |
| Ring Tear @ 171C, MPa | 1.21 | 0.86 | 0.79 |
| Lambourn @ 65% slip, g lost | 0.1505 | 0.1631 | 0.1727 |
| Lambourn @ 65% slip, INDEX | 0.99 | 0.92 | 0.87 |
| Wet Stanley London (#/std) | 54/47 | 53/47 | 53/47 |
| Shore A, @ 23 ± 2° C. | 64.1 | 64.3 | 65.7 |
| Rheometrics | | | |
| Tan delta @ 7% elong. 24° C. | 0.1809 | 0.1492 | 0.1579 |
| Delta G' X e-7 @ 24° C. | 4.92 | 2.365 | 2.759 |
| G' X e-7 @ 14.5% elong. 24° C. | 2.676 | 2.161 | 2.221 |
| Tan delta @ 7% elong. 50° C. | 0.1539 | 0.1134 | 0.1262 |
| Delta G' X e-7 @ 50° C. | 3.94 | 1.806 | 1.968 |
| G' X e-7 @ 14.5% elong. 50° C. | 2.485 | 1.999 | 1.943 |
| Molecular Weight Between Crosslinks | | | |
| Mc, g/mol | 11930 |  | 11830 |

Table IV uses a different silane (octyl triethoxy silane) in combination with silicas having higher inorganic salt content. The ML1+4 value shows the salt reduces the viscosity of the rubber composition. The 50% modulus is not decreased in this example but the 300% modulus increases. The tan delta values for the examples show promise for low rolling resistance in tires. The delta G' values indicate good dispersion and the Mc (molecular weight between crosslinks) indicates that the rubber portion of the control and the examples is crosslinked to the same extent.

TABLE V

RUBBER FORMULATIONS WITH 3 PHR OF SORBITAN MONOOLEATE AND SILICAS WITH DIFFERENT SALT CONTENTS

| | Control 4 HiSil ™ 190 | Ex. M | Ex. N |
|---|---|---|---|
| Silica Characterization | | | |
| Na2SO4 (wt. %) | <0.5 | 7.7 | 8.5 |
| Surface Area, m²/g | 200 | 191 | 190 |
| pH | 6.9 | 6.1 | 6.3 |
| Physical Test Results | | | |
| ML1 + 4/100C | 87.2 | 77.1 | 72.5 |
| Ring Tensile @ 24C | | | |
| 50% Modulus, MPa | 1.43 | 1.30 | 1.28 |
| 300% Modulus, MPa | 9.46 | 9.66 | 9.52 |
| Tensile str., MPa | 17.14 | 17.58 | 17.17 |
| % Elongation | 451 | 449 | 442 |
| Ring Tensile @ 100C | | | |
| 50% Modulus, MPa | 1.26 | 1.20 | 1.29 |
| 200% Modulus, Mpa | 4.50 | 4.77 | 4.80 |
| 300% Modulus, MPa | 7.86 | — | — |
| Tensile str., MPa | 9.41 | 8.72 | 8.77 |
| % Elongation | 344 | 309 | 306 |
| Ring Tear @ 171C, MPa | 0.80 | 0.81 | 0.85 |
| Lambourn @ 65% slip, g lost | 0.1457 | 0.1603 | 0.152 |
| Lambourn @ 65% slip, INDEX | 1.07 | 0.97 | 0.99 |
| Wet Stanley London (#/std) | 55/47 | 54/47 | 54/47 |
| Shore A, @ 23 ± 2° C. | 56.6 | 59 | 56 |
| Rheometrics | | | |
| Tan delta @ 7% elong. 24° C. | 0.1763 | 0.1582 | 0.1506 |
| Delta G' X e-7 @ 24° C. | 6.114 | 4.383 | 3.226 |
| G' X e-7 @ 14.5% elong. 24° C. | 3.381 | 2.954 | 2.631 |
| Tan delta @ 7% elong. 50° C. | 0.1598 | 0.1457 | 0.1304 |
| Delta G' X e-7 @ 50° C. | 4.045 | 3.598 | 2.539 |
| G' X e-7 @ 14.5% elong. 50° C. | 2.76 | 2.603 | 2.33 |
| Molecular Weight Between Crosslinks | | | |
| Mc, g/mol | 10180 | | 10400 |

Table IV illustrates that a silane is not required in the rubber formulation when a silica with a high salt content is substituted for a conventional silica. In Table V the 50% modulus at 24° C. is decreased slightly and the 300% modulus at 24° C. is increased slightly. The other physical properties are very acceptable. The delta G' is reduced indicating good dispersion, the tan delta is low indicating promise for low rolling resistance and the molecular weight between crosslinks indicate a comparable extent of cure of the rubber was achieved in the control and the examples.

TABLE VI

RUBBER FORMULATIONS WITH 1.65 PHR OF SORBITAN MONOOLEATE AND 1.25 PHR OF OCTYL TRIETHOXY SILANE AND SILICAS WITH DIFFERENT SALT CONTENTS

| | Control 5 HiSil ™ 190 | Ex. O | Ex. P |
|---|---|---|---|
| Silica Characterization | | | |
| Silica Na2SO4 (wt. %) | <0.5 | 7.7 | 8.5 |
| Surfaae Area, m²/g | 200 | 191 | 190 |
| pH | 6.9 | 6.1 | 6.3 |
| Physical Test Results | | | |
| ML1 + 4/100C | 71.4 | 63.3 | 58.1 |
| Ring Tensile @ 24C | | | |
| 50% Modulus, MPa | 1.28 | 1.19 | 1.13 |
| 300% Modulus, MPa | 9.50 | 9.39 | 9.33 |
| Tensile str., MPa | 16.67 | 16.17 | 17.70 |
| % Elongation | 440 | 431 | 456 |
| Ring Tensile @ 100C | | | |
| 50% Modulus, MPa | 1.10 | 1.14 | 1.09 |
| 200% Modulus, MPa | 4.25 | 4.52 | 4.44 |
| 300% Modulus, MPa | 7.59 | 8.04 | 8.10 |
| Tensile str., MPa | 9.28 | 8.43 | 8.82 |
| % Elongation | 347 | 309 | 319 |
| Ring Tear @ 171C, MPa | 1.27 | 1.02 | 0.93 |
| Lambourn @ 65% slip, g lost | 0.1789 | 0.1836 | 0.1651 |
| Lambourn @ 65% slip, INDEX | 0.95 | 0.92 | 0.98 |
| Wet Stanley London (#/std) | 57/48 | 56/48 | 53/47 |
| Shore A, @ 23 ± 2° C. | 53.2 | 52.7 | 51 |
| Rheometrics | | | |
| Tan delta @ 7% elong. 24° C. | 0.1828 | 0.1489 | 0.1556 |
| Delta G' X e-7 @ 24° C. | 4.828 | 3.01 | 2.893 |
| G' X e-7 @ 14.5% elong. 24° C. | 2.652 | 2.367 | 2.262 |
| Tan delta @ 7% elong. 50° C. | 0.154 | 0.1201 | 0.1231 |
| Delta G' X e-7 @ 50° C. | 3.679 | 2.203 | 1.798 |
| G'X e-7 @ 14.5% elong. 50° C. | 2.34 | 2.148 | 1.892 |
| Molecular Weight Between Crosslinks | | | |
| Mc, g/mol | 11110 | | 12060 |

Table VI illustrates that a silane (octyl triethoxy silane) can be used in reduced amounts with a conventional additive (sorbitan monooleate) with silicas having higher inorganic salt contents. In Table VI the 50% modulus at 24° C. decreased slightly and the 300% modulus at 100° C. increased slightly. The tan delta values indicated promise for low rolling resistance. The delta G' values indicated good dispersion. The molecular weight between crosslinks indicated comparable extents of rubber crosslinking in the control and examples.

While in accordance with the patent statutes the best mode and preferred embodiment has been set forth, the scope of the invention is not limited thereto, but rather by the scope of the attached claims.

What is claimed is:

1. A crosslinked rubber composition, comprising;
   a) natural rubber EPDM rubber, butyl rubber, halobutyl rubber, halogenated isobutylene-p-methylstyrene rubber, or a synthetic rubber having at least 30 wt. % repeat units from one or more conjugated diene monomers having from 4 to 8 carbon atoms, or combinations of said rubbers, and b) about 4 to about 90 phr of a precipitated particulate silica component including from 3 to about 30 percent by weight of inorganic salt comprising $Na^+$, $Li^+$, $Mg^{++}$, $Ca^{++}$, or $K^+$, or combinations thereof along with $Cl^-$, $SO_4^-$, $CO_3^-$, or $PO_4^-$, or combinations thereof based upon said precipitated silica component wherein said phr is parts by weight per 100 parts by weight of total rubber, and wherein said inorganic salt results in at least a 5% reduction in the tan delta at 50° C. of said crosslinked rubber composition over a control using said silica without said inorganic salt.

2. A crosslinked rubber composition according to claim 1, wherein the amount of said salt is from about 5 to about 30 percent by weight.

3. A crosslinked rubber composition according to claim 2, wherein said salt comprises sodium sulfate.

4. A crosslinked rubber composition according to claim 3, wherein said composition is cured with sulfur or a sulfur based accelerator or combinations thereof and wherein said composition includes from about 2 to about 80 phr of carbon black.

5. A crosslinked rubber composition according to claim 1, including from about 0.1 to about 20 parts by weight of silane per 100 parts of silica.

6. A crosslinked rubber composition according to claim 5, wherein the amount of said silane is from about 0.5 to about 18 parts by weight.

7. A crosslinked rubber composition according to claim 1, wherein said composition is a component of a pneumatic tire.

8. A pneumatic tire including a crosslinked rubber composition comprising natural rubber, EPDM rubber, butyl rubber, halobutyl rubber, halogenated isobutylene-p-methylstyrene rubber or a synthetic rubber having at least 30 wt. % repeat units from one or more conjugated diene monomers having from 4 to 8 carbon atoms, or combinations of said rubbers; and at least one particulate precipitated silica filler having from 3 to about 30 percent by weight of an inorganic salt comprising a Na, Li, Ca, Ma, or K salt of hydrochloric, sulfuric, phosphoric or carbonic acid or combinations thereof based upon said silica filler, and wherein said inorganic salt results in a decrease of at least 5% in the tan delta at 50° C. of said crosslinked rubber composition over a control using said silica without said inorganic salt.

9. A pneumatic tire according to claim 8, wherein the amount of silica component is from about 4 to about 90 parts by weight per 100 parts by weight total rubber.

10. A pneumatic tire according to claim 9, said crosslinked rubber composition further including from about 0.1 to about 20 parts by weight of a silane per 100 parts of silica.

11. A pneumatic tire according to claim 9, wherein said 100 parts by weight rubber comprise natural rubber, EPDM rubber, or a synthetic diene rubber having at least 30 wt. % repeat units from one or more conjugated diene monomers having from 4 to 8 carbon atoms or combinations of said rubbers.

12. A pneumatic tire according to claim 9, wherein the amount of said silica component is from about 10 to about 50 phr.

13. A pneumatic tire according to claim 11, wherein the amount of said silica component is from about 10 to about 50 phr.

* * * * *